(12) United States Patent
Doh et al.

(10) Patent No.: US 7,280,758 B2
(45) Date of Patent: Oct. 9, 2007

(54) OPTICAL MULTI-RING NETWORK FOR BURST DATA COMMUNICATION

(75) Inventors: Sang-Hyun Doh, Hwasong-shi (KR); Se-Kang Park, Songnam-shi (KR); Ki-Cheol Lee, Suwon-shi (KR); Yun-Je Oh, Yongin-shi (KR); Byung-Chang Kang, Yongin-shi (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 716 days.

(21) Appl. No.: 10/456,144

(22) Filed: Jun. 6, 2003

(65) Prior Publication Data

US 2004/0071468 A1     Apr. 15, 2004

(30) Foreign Application Priority Data

Oct. 15, 2002     (KR)     ............. 10-2002-0062819

(51) Int. Cl.
*H04J 14/02*     (2006.01)
*H04B 10/20*     (2006.01)

(52) U.S. Cl. ......................................... 398/59; 398/83
(58) Field of Classification Search ............ 398/48–51, 398/59, 83
See application file for complete search history.

(56) References Cited

U.S. PATENT DOCUMENTS 6,226,111 B1 *  5/2001  Chang et al. .................. 398/9
6,810,211 B1 * 10/2004  Castanon ..................... 398/47

FOREIGN PATENT DOCUMENTS

JP     2002-261782     9/2002
JP     2002-290434     10/2002

* cited by examiner

*Primary Examiner*—Leslie Pascal
(74) *Attorney, Agent, or Firm*—Cha & Reiter, L.L.C.

(57) ABSTRACT

An optical multi-ring network for burst data communication is disclosed. The multi-ring network includes a plurality of optical single-ring networks having a plurality of optical add/drop routers connected with each other through fiber links, and a core optical router for supporting communication between the optical single-ring networks. The core optical router includes a wavelength division demultiplexing section for demultiplexing optical signals received from the each single-ring network and outputting the demultiplexed optical signals as channels whose wavelengths are different from each other; a branching section for branching off and outputting a portion of each channel; and a switching section for switching each channel to a path directed to the destination of each channel according to a first control signal. The core optical router also includes a contention resolution block for aligning channels in a chronological order, which are output at the switching section and directed to identical destinations, according to a second control signal; a wavelength division multiplexing section for collecting channels which pass through the contention resolution block according to destination and outputting the collected channels as multiplexed optical signals; and a controller for recognizing a destination of each branched channel input from the branching section and outputting a third control signal to the switching section and the contention resolution block so as to a low each channel to be directed to the destination of each channel. A frame transmitted on the multi-ring network includes a burst datum consisting of a plurality of packet data, and a header datum indicating a destination of the burst datum.

15 Claims, 7 Drawing Sheets

OPTICAL MULTI-RING NETWORK FOR BURST DATA COMMUNICATION

CLAIM OF PRIORITY

This application claims priority to an application entitled "Optical Multi-Ring Network For Burst Data Communication," filed in the Korean Intellectual Property Office on Oct. 15, 2002 and assigned Ser. No. 2002-62819, the contents of which are hereby incorporated by reference.

BACKGROUND OF THE INVENTION

1. Field of the Invention

The present invention relates to an optical ring network, in particular to an optical multi-ring network employing wavelength division multiplexing.

2. Description of the Related Art

It is essential for all optical networks to be configured/scalable to deal with tremendous growth in a data traffic. In this regard, various conventional solutions have been proposed for configuring optical networks and considerable effort has been made to develop various optical transmission systems and optical routing devices to meet this growing data traffic demand.

Optical ring networks based on Wavelength Division Multiplexing (WDM)have several advantages due to their ease of configuration, switching restoration, and reduction of initial costs. Since such WDM optical networks are constructed as an optical ring network which itself is based on WDM, there are future prospects that an optical cross-connect (OXC) may be employed in the optical ring networks to accomplish inter-ring connection between such optical ring networks. As incorporated herein, such an optical network used to connect a plurality of optical single-ring networks is called an optical multi-ring network. In this case, each of the optical single-ring networks includes a plurality of core nodes. However, because an optical multi-ring network is designed to route communication through various channels and because these channels are set in advance, such optical multi-ring networks have a serious drawback regarding their flexibility to coping with data traffic bursts. This results in a significant decrease in total performance of bandwidths.

To overcome these disadvantages, an optical router, based on an optical packet switching (OPS) technique and an optical burst switching (OBS) technique have been used. These optical routers, however, also suffer from drawbacks caused by optical components such as an optical buffer, a high speed optical switch and so forth. For this reason, alternative solutions have been sought, e.g., which make use of a burst delay line, a wavelength converter, etc., all of which are based on optical fibers. However, these alternative solutions have not brought satisfactory results. In addition, these alternative solutions have not proven to be economical.

Accordingly, there is a need in the art for improved optical multi-ring networks.

SUMMARY OF THE INVENTION

One aspect of the present invention is to provide an optical multi-ring network suitable for transmitting a high volume of burst data and which has an excellent implementation capability from a technical and economical point of view.

It is another aspect of the present invention to provide an optical multi-ring network capable of improving performance of bandwidths and allowing practical implementation.

One embodiment of the present invention is directed to an optical multi-ring network for burst data communication, including a plurality of optical single-ring networks each having a plurality of optical add/drop routers connected with each other through fiber links; and a core optical router for supporting communication between the optical single-ring networks. The core optical router includes a wavelength division demultiplexing section for demultiplexing optical signals received from the each single-ring network and for outputting the demultiplexed optical signals to channels the wavelengths of which are different from each other. The network also includes a branching section for branching off and outputting a portion of each channel; a switching section for switching each channel to a path directed to the destination of each channel according to a first control signal; a contention resolution block for aligning channels which have been outputted at the switching section and directed to identical destinations, in a chronological order according to a second control signal; a wavelength division multiplexing section for collecting channels which pass through the contention resolution block according to the destination of each channel and outputting the collected channels as multiplexedoptical signals; and a controller for recognizing a destination of each branched channel inputted from the branching section and for outputting a first control signal to the switching section and a second control signal to the contention resolution block so as to allow the each channel to be directed to destinations of each channel. A frame transmitted on the multi-ring network includes a burst datum consisting of a plurality of packet data, and a header datum indicating the destination of the burst datum.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described in detail with reference to the accompanying drawings. For the purposes of clarity and simplicity, detailed descriptions of known functions and configurations incorporated herein will be omitted as it may obscure the subject matter of the present invention.

Figure 1:
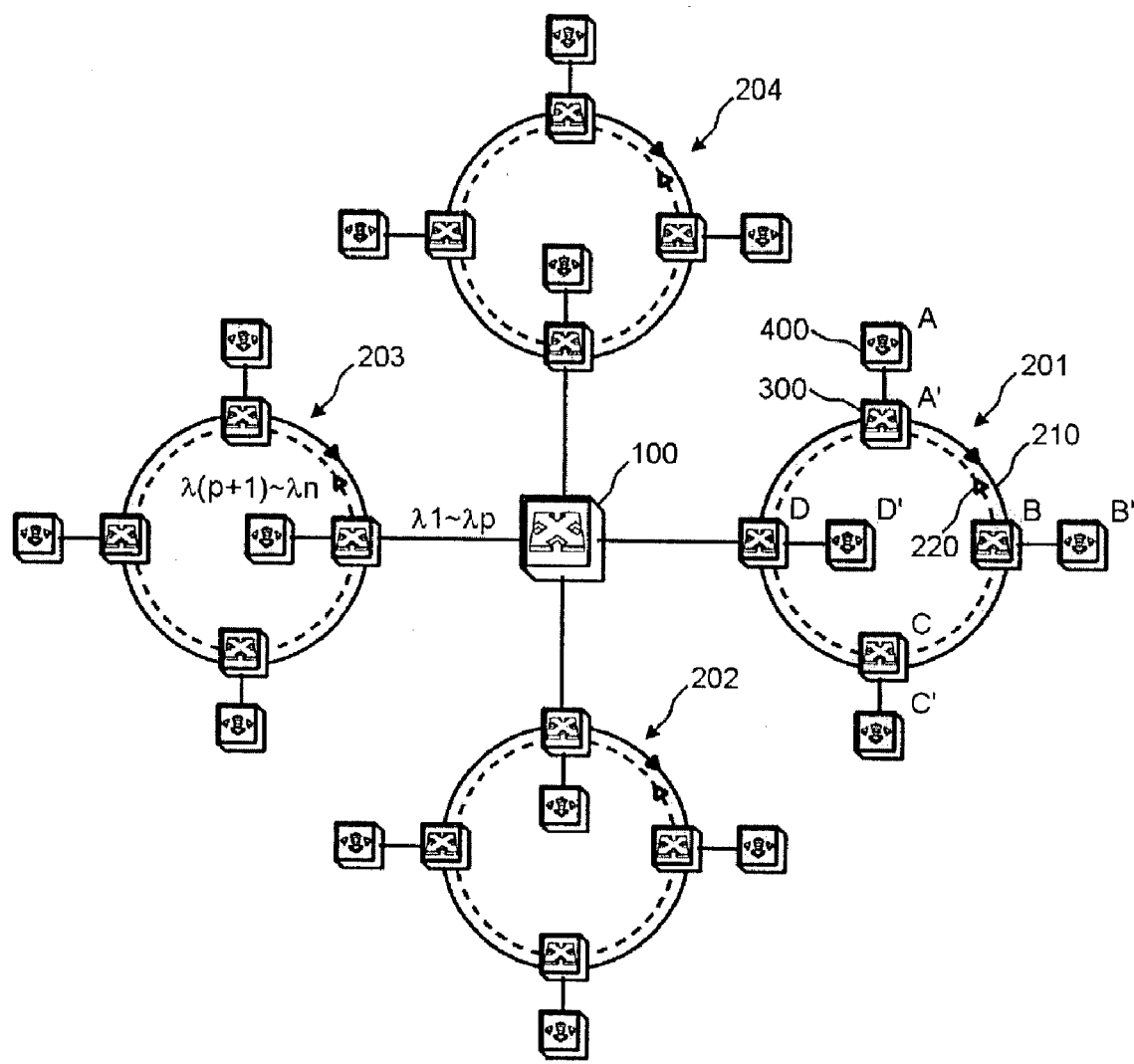
FIG. 1 shows a schematic configuration of an optical multi-ring network for burst data communication according to a preferred embodiment of the present invention.

FIG. 1 shows an optical multi-ring network configuration for burst data communication according to a preferred embodiment of the present invention. The optical multi-ring network includes first to fourth optical single-ring networks 201 to 204, and an optical core router 100 for supporting communication between the optical single-ring networks 201 to 204. In the single-ring networks 201-204, n number of channels may be used, the wavelengths of which are different from each other, where n is the natural number. For instance, some of the total channels, $1^{st}$ to $p^{th}$ channels $\lambda 1$ to $\lambda p$, may be used for inter-ring communication, and the others, $p+1^{st}$ to $n^{th}$ channels, may be used for intra-ring communication. Of course, it should be understood that this is not a fixed allocation of the total channels. Therefore, to allocate the channels for inter-ring communication and intra-ring communication should be determined depending on the bandwidth and the traffic level which are needed in the single-ring or the multi-ring networks. With the state of the art networking construction techniques, the number of wavelength division multiplexing (WDM) channels is generally 32. However, with development of optical transmission technology, it is expected that the number will become 64 or 128, in the near future.

Each of the single-ring networks 201-204 include a plurality of optical add/drop routers 300 connected with each other through a working or forward fiber link 210 and a protection or backward fiber link 220, and a plurality of edge optical routers 400 connected with the plurality of optical add/drop routers 300 in a one-to-one correspondence. Between the optical add/drop routers 300, at least one optical signal is transmitted. The optical signal consists of a plurality of channels and is subjected to WDM. At least one independent channel optical signal is transmitted between any one of the optical add/drop routers 300 and the corresponding one of the edge optical routers 400. The single-ring networks 201-204 perform communication on the basis of a unit of burst data, in which packet data collected from a plurality of service devices are sorted based on a destination. The sorted data are bound in a predetermined data length, and then the bound data are transmitted. In this regard, a frame that is transmitted on each channel includes a burst datum consisting of packet data having an identical destination and a quality of service (QOS), and a header datum indicating a destination of the frame. In each of the optical add/drop routers 300, a header datum is recognized through a frame modulated on each channel, and on the basis of this, switching is carried out. More specifically, when each optical add/drop router 300 matches a destination with the one indicated by the recognized header datum, it causes the modulated frame to be dropped. However, when it cannot match them, it causes the modulated frame to be passed through into the next optical add/drop router 300.

For transmission of the header datum, various methods may be used. For example, a method for transmitting only header datum through one allocated optical channel (usually, referred to as a "supervisory channel") or a method for transmitting a header datum attached to a burst datum through an individual channel may be used. However, in case of the former, there is a high blocking possibility between header data because there are many optical channels for WDM. To avoid this blocking, the bit rate of the supervisory channel may be increased. As a result, the amount of header datum transmitted per channel is decreased, so that all the control and header information on the 32, 64, or more WDM optical channels can be carried on a header frame of one time slot.

Figure 2:
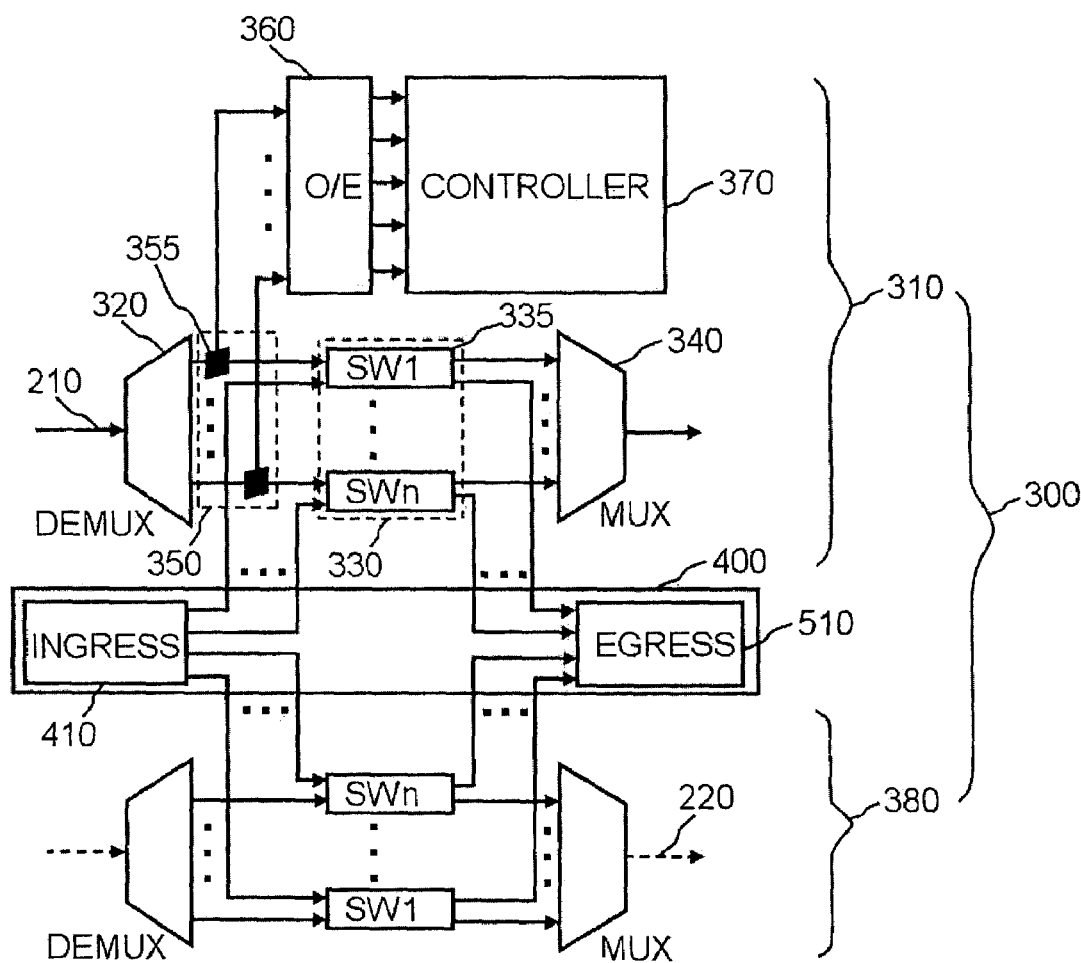
FIG. 2 illustrates configuration of any one of the optical add/drop routers shown in FIG. 1.
Figure 3:
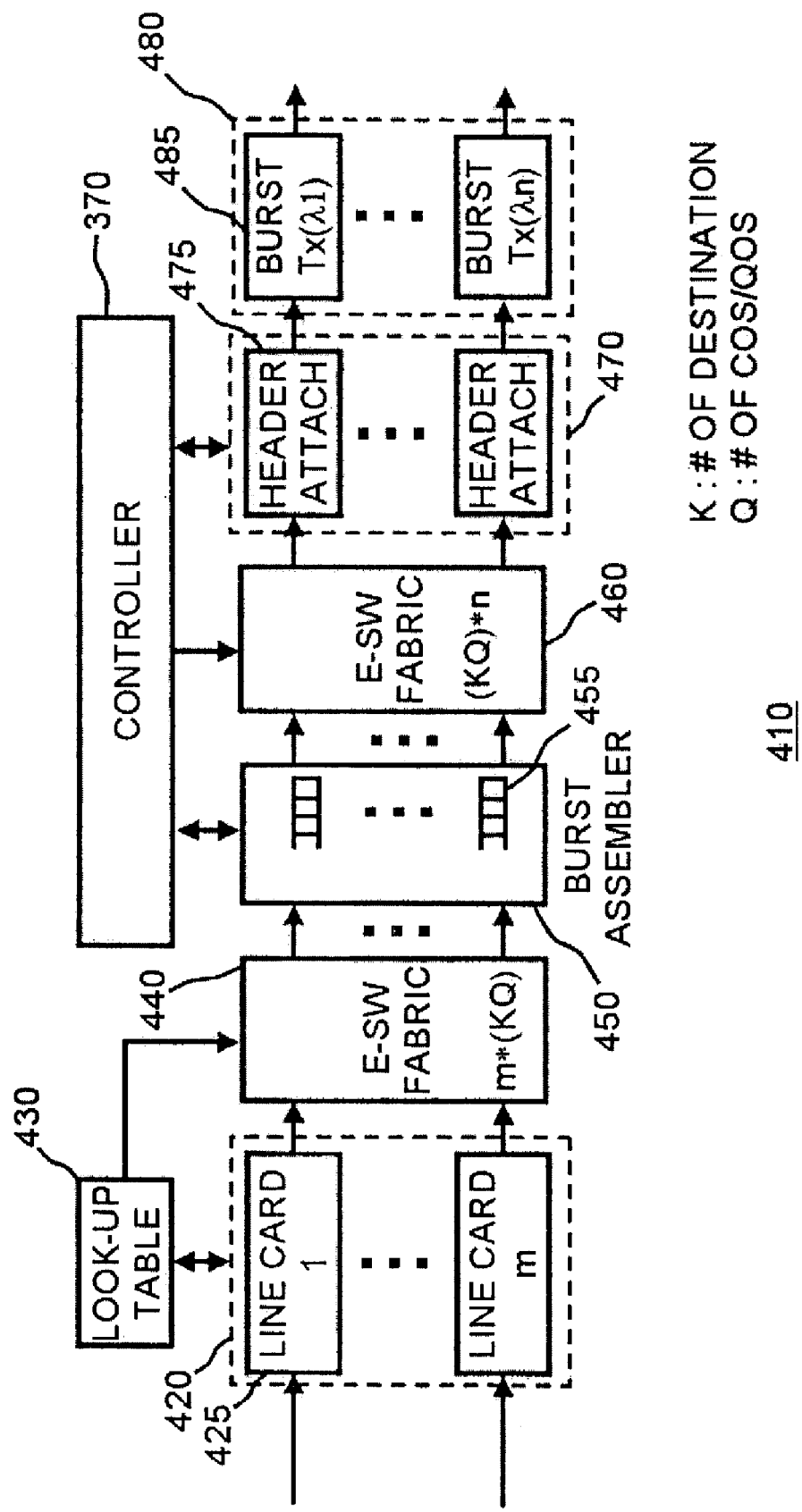
FIG. 3 illustrates configuration of an ingress node shown in FIG. 2.
Figure 4:
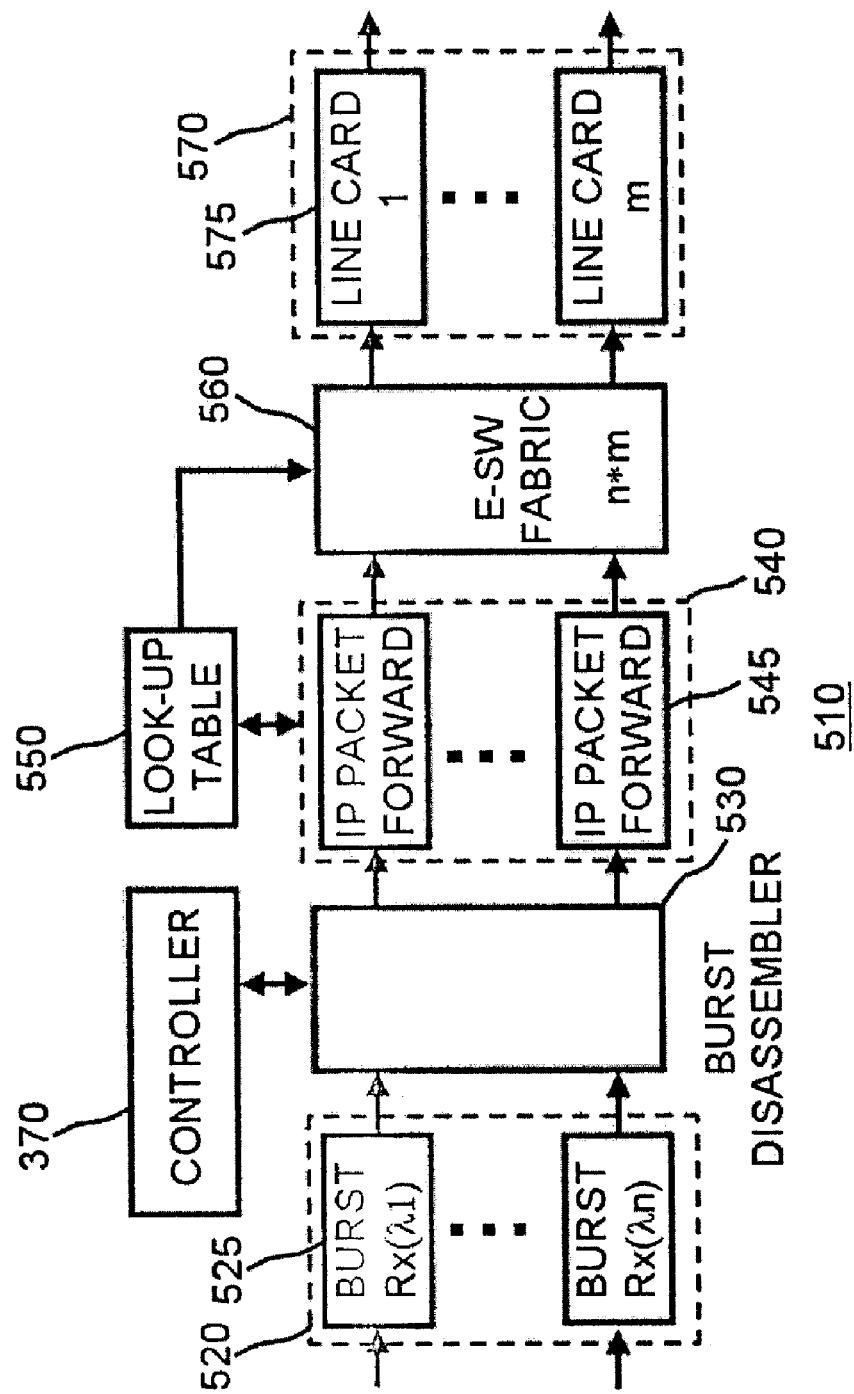
FIG. 4 illustrates configuration of an egress node shown in FIG. 2.

FIG. 2 illustrates configuration of the optical add/drop routers 300 shown in FIG. 1. FIG. 3 illustrates configuration of an ingress node 410 shown in FIG. 2. FIG. 4 illustrates configuration of an egress node 510 shown in FIG. 2.

Referring to FIG. 2, each optical add/drop router 300 generally includes two kinds of components, which are sorted into components for working fiber links 310 and components for protection fiber links 380. In a normal state, the working and protection fiber links 210 and 220 are utilized in tandem. However, in an abnormal or link failure state, the protection fiber links 220 are utilized more than the working fiber links 210. For the sake of convenience, the following description will be made only for components of a working fiber link 210.

The optical add/drop router 300 includes a demultiplexer 320, an add/drop section 330, a multiplexer 340, a branching section 350, an optical receiving section 360 and a controller 370.

The demultiplexer 320 demultiplexes and outputs at least one optical signal input from another adjacent optical add/drop router 300 by channel (or wavelength).

The add/drop section 330 includes n number of optical switches 335, where n is a positive, whole number, which are connected to output terminals of the demultiplexer 320 in a one-to-one correspondence. The optical switches 335 perform switching operations according to a control signal from the controller 370. The optical switches 335 also function either to drop channels input from the demultiplexer 320 toward the egress node 510, which is configured for the corresponding edge optical router 400, or to pass the channels through to the multiplexer 340. Further, the optical switches 335 function to add channels input from the ingress node 410, which is configured for the corresponding edge optical router 400, and to output the added channels to the multiplexer 340.

The multiplexer 340 allows a plurality of channels input from the add/drop section 330 to be multiplexed and output.

The branching section 350 includes n number of tap couplers 355, which are connected to n number of output terminals of the demultiplexer 320 in a one-to-one correspondence, where n is the positive, whole number. The branching section 350 is positioned between the demultiplexer 320 and the add/drop section 330 and branches off a portion of each channel. In this regard, for each channel input to the tap coupler 355, the branching section 350 supplies light with approximately 10% of the entire power of each channel to the optical receiving section 360 and the other light with approximately 90% of the entire power of each channel to the optical switches 335.

The optical receiving section 360 includes n number of optical receivers which are connected to n number of optical switches 335 in a one-to-one correspondence, wherein n is the positive, whole number. The optical receiving section 360 performs photoelectric conversion of the branched channel and outputs the results.

The controller 370 demodulates a frame on the channel which is subjected to photoelectric conversion, extracts a header datum from each demodulated frame, and recognizes a corresponding destination from the extracted header datum. In addition, the controller detects a frame the destination of which matches with the add/drop section 330, and causes a control signal for alternatively dropping the detected frame to be output to the add/drop section 330. In this way, the controller 370 outputs a control signal to the optical switches 335 into which the channel with the detected frame modulated is input while the optical switches 335 perform switching operations, so that the corresponding channel is dropped toward the egress node 510. The controller 370 also determines channels for transmitting the modulated frames as well as time points for transmitting the channels, by recognizing a destination, a QOS and so forth of each frame created from the ingress node 410.

Each of the edge optical routers 400 includes an ingress node 410 and an egress node 510.

Referring now to FIG. 3, the ingress node 410 includes an interface section 420, a look-up table 430, a first electric switch 440, a burst assembler 450, a second electric switch 460, a header attaching section 470, and an optical transmitting section 480.

The interface section 420 includes m number of interface line cards 425, where m is the positive, whole number, each of which is physically connected with each service device. This service device may be an IP router, an Ethernet switch, a SONET equipment and similar device. The interface section 420 provides interfaces to various service formats, and it recognizes destinations, QOSes and so forth so that a control signal of packet data received from several positions at a time (for example, a header packet of IP data) is extracted.

The look-up table 430 has buffer numbers of the burst assembler 450 stored according to a destination and a QOS.

The first electric switch 440 permits data input from each interface card 425 to be output to the pertinent buffers 455 with reference not only to the destination and QOS recognized at the interface section 420 but also to the look-up table 430.

The burst assembler 450 includes n number of buffers 455, which are subdivided according to a destination and a QOS. The burst assembler 450 binds packet data stored at the individual buffer 455 at a predetermined length in order to create burst data.

The header attaching section 470 includes n number of header attachments 475, which are connected to the buffers in a one-to-one correspondence. When a header datum representing a certain destination is attached to a leading end of the burst datum input through the second electric switch 460, a finished frame is obtained.

The second electric switch 460 enables each burst datum distributed to the buffers 455 of the burst assembler 450 based on the control signal of the controller 370 to be output to the pertinent header attachments 475. In this way, the second electric switch 460 functions to output each burst datum to the pertinent header attachments 475 along the channels selected, and allows the burst data distributed to the buffers 455 to be transmitted to the optical add/drop router 300.

The optical transmitting section 480 includes n number of optical transmitters 485 which allow for outputting channels whose wavelengths are different from each other. The optical transmitters 485 are connected to the header attachments 475 in a one-to-one correspondence, and enable the channels input from the pertinent header attachments 475, frames of which are modulated, to be output. For example, the optical transmitters 485 may make use of a laser diode, a light emitting diode and similar light emitting device.

Referring now to FIG. 4, each of the egress nodes 510 includes an optical receiving section 520, a burst disassembler 530, a look-up table 550, an IP packet forwarding section 540, an electric switch 560 and an interface section 570.

The optical receiving section 520 includes n number of optical receivers 525, which receive channels whose wavelengths are different from each other and which are connected to the optical switches 335 of the optical add/drop router 300 in a one-to-one correspondence. The optical receivers 525 carry out photoelectric conversion and output the results. For example, each optical receiver 525 may make use of a photodiode.

The burst disassembler 530 removes header data from frames input from the each optical receiver 425, and disassembles burst data into packet data.

The IP packet forwarding section 540 includes m number of IP packet forwarders 545 and recognizes a final destination, i.e., an IP address of packet data inputted from the burst disassembler 530.

The look-up table 550 has numbers of the pertinent interface cards 575 stored according to each IP address.

The electric switch 560 outputs packet data input from each IP packet forwarder 545 to the pertinent interface cards 575 of the interface section 570 with reference to IP addresses recognized from the IP packet forwarding section 540 as well as from the look-up table 550.

The interface section 570 includes m number of interface cards 575, each of which is physically connected with each service device. For example, the service device may be an IP router, an Ethernet switch, SONET equipment and similar device. The interface section 570 provides interfaces to various service formats.

Figure 5:
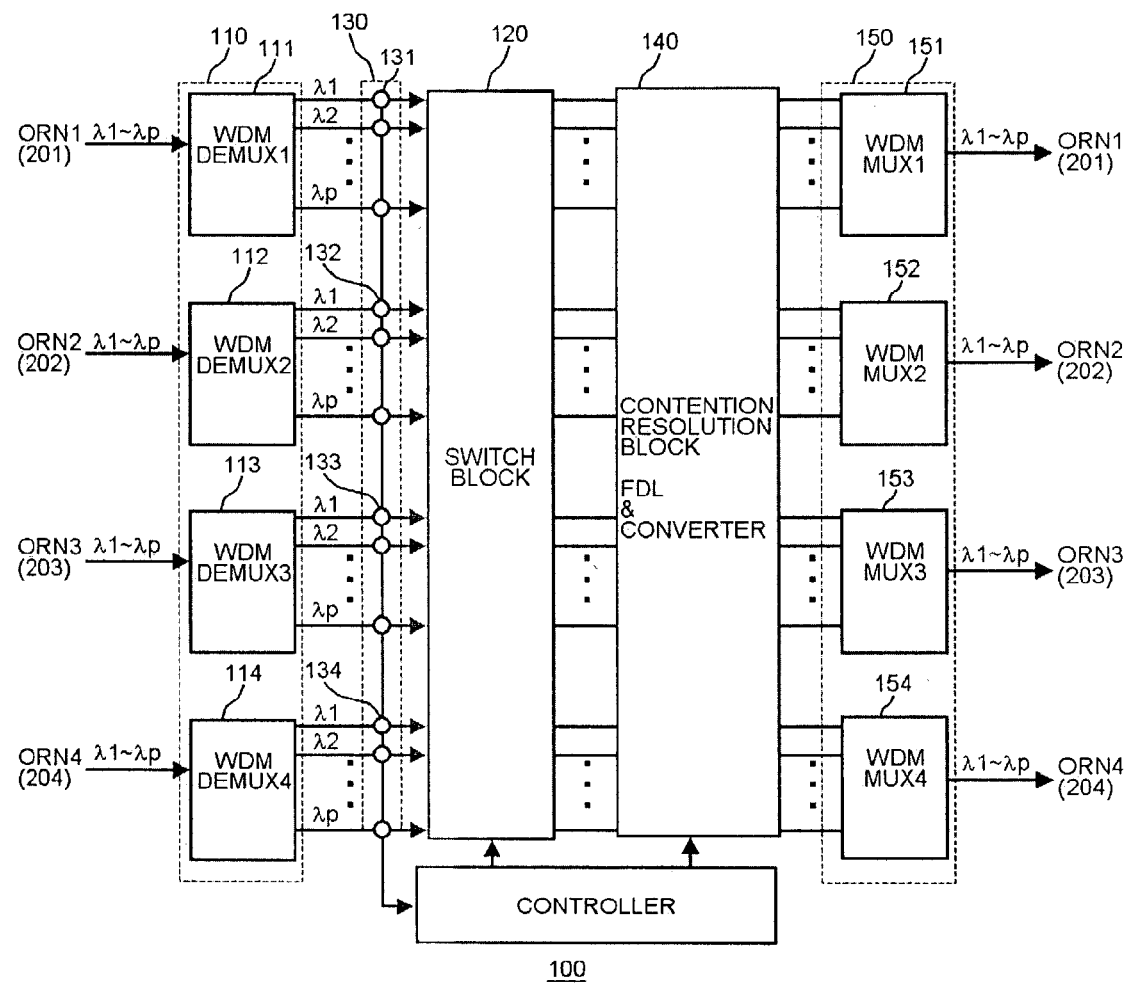
FIG. 5 illustrates configuration of a core optical router shown in FIG. 1.

FIG. 5 illustrates a configuration of a core optical router shown in FIG. 1. The core optical router includes a demultiplexing section 110, a branching section 130, a switching section 120, a contention resolution block 140, a multiplexing section 150 and a controller 100.

The demultiplexing section 110 includes first to fourth demultiplexers 111-114 connected with first to fourth single-ring networks 201-204. A multi-wavelength optical signal received from each of the single-ring networks 201-204 is demultiplexed, and the demultiplexed optical signal is output in $1^{st}$ to $p^{th}$ channels $\lambda 1$ to $\lambda p$ whose wavelengths are different from each other. More specifically, each optical signal input from the first to fourth single-ring networks 201-204 connected with first to fourth demultiplexers 111-114 is demultiplexed so that the $1^{st}$ to $p^{th}$ channels $\lambda 1$ to $\lambda p$, each of which has a different wavelength, are output. For example, each of the demultiplexers 111-114 may be used as a 1×4 arrayed waveguide grating.

The branching section 130 includes first to fourth couplers 131-134, and functions to branch off and output a portion of each channel. The first to fourth couplers 131-134, connected with the first to fourth demultiplexers 111-114 in a one-to-one correspondence, cause a portion of each channel input from each of the corresponding demultiplexers 111-114 to be branched off. The branched portion of each channel is output to the controller 100.

The switching section 120 allows each channel to be switched with each path directed to the destinations of each channel based on a control signal. For example, when a destination of one input channel is the second single-ring network 202, the switching section 120 performs switching to output the channel to the path which is directed to the second single-ring network 202.

The contention resolution block 140 aligns the channels output from the switching section 120 in a chronological sequence a plurality of channels, which are directed to the identical destination. In this regard, the contention resolution block 140 functions to realign an output sequence to prevent the channels which are directed to the identical destination from interfering with each other.

The multiplexing section 150 includes first to fourth multiplexers 151-154, wherein a plurality of channels, which pass through the contention resolution block 140, are collected according to a destination, and then the collected channels are output as a multiplexed optical signal. The first to fourth multiplexers 151154 are connected with the first to fourth single-ring networks 201-204 in a one-to-one correspondence.

The controller 100 recognizes a destination of each branched channel, and then outputs a control signal so that each channel is directed to its destination. Specifically, the controller 100 demodulates frames from each branched channel, extracts header data from the demodulated frames, reads information about the address and the QOS in order to control the switching section and the contention resolution block.

Figure 6:
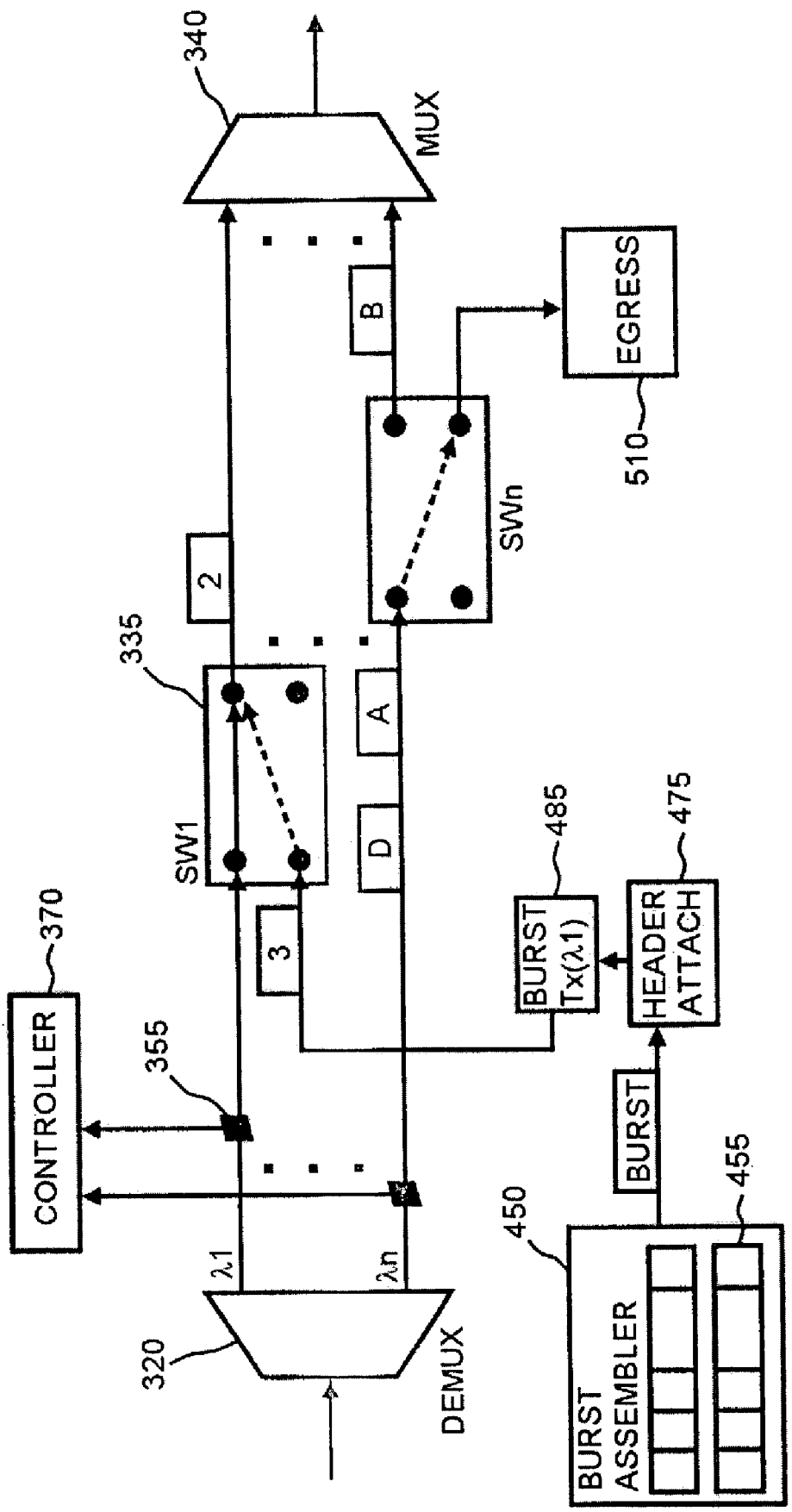
FIG. 6 is a schematic illustrating an add/drop process of an channel of an optical add/drop router A belonging to a first optical single-ring network shown in FIG. 1.
Figure 7:
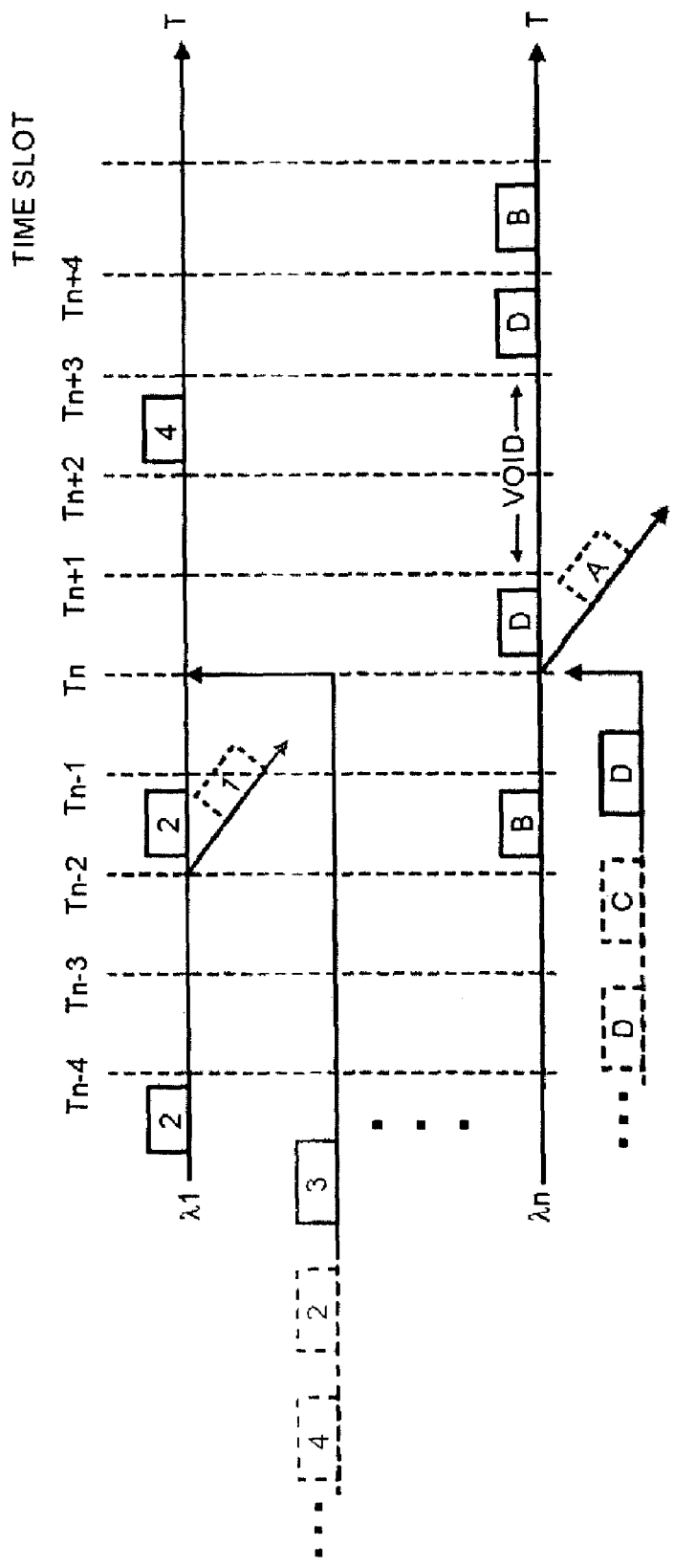
FIG. 7 shows a time slot associated with an optical add/drop router A.

FIG. 6 is a schematic illustrating an add/drop process of a channel of an optical add/drop router A belonging to the first optical single-ring network shown in FIG. 1.FIG. 7 shows a time slot diagram associated with the optical add/drop router A. For the purpose of clarity of the components of the optical add/drop router A and an edge optical router A', some components associated with the add/drop process of a channel are shown in FIG. 5, together with a plurality of frames modulated on channels. The character attached to each frame represents each add/drop router 100 determined as the destination of that frame. For the sake of convenience, hereinafter the frame A is defined as the one, the destination of which is the add/drop router A. Further, the single-ring networks are worked by n number of channels that have wavelengths that are different from each other. It is assumed herein that some of the channels, for example $1^{st}$ to $p^{th}$ channels $\lambda 1$ to $\lambda p$, are used for inter-ring communication, while the others, for example $p+1^{st}$ to $n^{th}$ channels, are used for intra-ring communication.

The controller 370 of the optical add/drop router A 300 examines channels with reference to destination of the pertinent frame, QOS, routing protocol and so forth and determines an add time. The controller 370 selects an empty channel at a particular time when a frame to be added has to uplink, and permits the frame to be added to the empty time slot. This added channel is multiplexed with other channels and transmitted together. The controller 370 recognizes a destination of the frame, and takes into consideration whether the destination is the single-ring network 201 for the frame or it is another adjacent one of the single-ring networks 202-204.

The following will describe a drop process of an $n^{th}$ channel $\lambda n$ of the optical add/drop router A, and then an add process of the $1^{st}$ channel $\lambda 1$ of the optical add/drop router A.

Referring to FIG. 6, the controller 370 recognizes a corresponding destination of a frame by means of a portion of an $n^{th}$ channel $\lambda n$ branched off by the tap coupler 355, and detects a frame targeting the corresponding destination, i.e., the optical add/drop router A. The controller outputs a control signal to an SWn, i.e., an $n^{th}$ optical switch 335, so as to alternatively drop the detected frame. The frames B, A and D are sequentially input to the SWn. Then, the controller 170 recognizes that a destination of the frame A matches with the optical add/drop router A, and outputs the control signal to the SWn. The SWn performs a switching operation, so that the $n^{th}$ channel $\lambda n$ is input into the egress node 510 of the edge node A' 400.

The drop process will be described below in time sequence with reference to FIG. 7.

At Tn−1, frame B is input. The frame B sets the optical add/drop router B as its destination, and it thus passes through the SWn.

At Tn, frame A is input. The controller 370 outputs the control signal to the SWn. As the SWn performs switching operation, frame A is output to the egress node 510 of the edge node A'.

At Tn+1, frame D is input. The controller 370 outputs the control signal to the SWn. As the SWn performs the switching operation, frame D is output to the multiplexer 340. Since the destination of frame D is the optical add/drop router D, it passes through the SWn.

Now, the add process of the $1^{st}$ channel $\lambda 1$ of the optical add/drop router A 300 will be described.

The controller 370 determines a channel into which and a time point at which a frame 3 having been created at the ingress node 410 is to be transmitted. Burst data for the frame 3 are stored on the buffers 455 of the burst assembler 450. The second electric switch 460 of the ingress node 410 keeps the burst data stored until a control signal is input from the controller 370. The controller 370 recognizes the situations of all channels in the network by means of the branching section 350, determines burst data which should be sequentially transmitted under a consideration for QOS, communication protocol and the like, with respect to all burst data stored in the burst assembler 350, and checks all channels to find an empty time slot. Then, when an optimal channel (in this case, the $1^{st}$ channel) and an empty time slot are selected, the control signal is output into the second electric switch 460 in the ingress node 410. Both burst data and header data, which are in a waiting state, are bound to create the frame 3, the $1^{st}$ channel with the modulated frame 3 is outputted to an SW1, i.e., the $1^{st}$ optical switch 135. Then, the $1^{st}$ channel is input through the SW1 into the multiplexer 340.

The add process of the $1^{st}$ channel $\lambda 1$ will be described below with reference to FIG. 7.

The controller 370 keeps burst data for transmission in a waiting state up to Tn, and outputs a control signal to the second electric switch 360 at Tn. The second electric switch 460 causes buffers 455, on which the burst data are stored, to be connected with the corresponding header attachments 475. The header attachment 475 binds the burst data together with the corresponding header data to create a frame 3. Next, the corresponding optical transmitters 485 output the $1^{st}$ channel $\lambda 1$ with the modulated frame 3 to the SW1. Then, the $1^{st}$ channel $\lambda 1$ is outputted through the SW1 to the multiplexer 340.

As described above, optical multi-ring networks according to one or more embodiments of the present invention are capable of performing communication based on frames consisting of burst data and header data, so that it is suitable for transmission of a high volume of burst data.

Further, optical multi-ring networks according to one or more embodiments of the present invention have a flexible configuration capable of using tap couplers, the optical switches and so forth when performing an add/drop process on channels, so that it has an excellent implementation capability from a technical or economical point of view.

Moreover, the optical multi-ring network according to one or more embodiments the present invention provides an improved bandwidth performance in the network by using electrical buffers in the edge optical routers.

What is claimed is:

1. An optical multi-ring network for burst data communication, comprising:
   a plurality of optical single-ring networks having a plurality of optical add/drop routers connected to each other through at least two fiber links, the optical add/drop routers includes:
      a demultiplexer arranged to demultiplex at least one received optical signal into a plurality of channels by wavelength;
      an add/drop section for dropping channels selected from the plurality of channels according to a fourth control signal;
      a multiplexer arranged to multiplex and output the plurality of channels input through the add/drop section;
      a branching section, positioned between the demultiplexing section and the add/drop section, for branching off a portion of each channel; and
      a controller for recognizing a destination of a modulated frame on each branched channel input from the branching section and for outputting a fifth control signal which is for dropping the selected channels to the add/drop section;
   an ingress node attached to each of the plurality of optical add/drop routers, the ingress node includes:
      a burst assembler having a plurality of buffers;
      an interface section, physically connected with a plurality of service devices, for recognizing a destination of packet data inputted from the service devices;
      a first electric switch for permitting the packet data input from the interface section to be output to the corresponding buffers of the burst assembler according to the destination;
      a header attaching section for permitting the input burst datum and a header datum indicating the destination to be bound to create a frame;
      a second electric switch for permitting the burst datum stored on the corresponding buffers of the burst assembler to be output to the header attaching section based on the control signal of the controller;
      an optical transmitting section for enabling channels having a modulated frame and have been input from the header attaching section to be output to the add/drop section of the optical add/drop router,
   a look-up table for storing a sequence of the buffers of the burst assembler according to a destination and a quality of service; and
   a core optical router for supporting communication between the optical single-ring networks, the core optical router including:
   a wavelength division demultiplexer arranged to demultiplex at least one optical signal received from at least one of the single-ring networks and output the demultiplexed optical signal to a plurality of channels the wavelengths of which are different from each other;
   a branching circuit arranged to branch off and output a portion of the demultiplexed optical signal on at least one of the plurality of channels;
   a switching section for switching the at least one of the plurality of channels to a path directed to a destination of the at least one channel according to a first control signal;
   a contention resolution block for aligning channels in a chronological order, which are output at the switching section and directed to identical destinations, according to a second control signal;
   a wavelength division multiplexer for collecting channels which pass through the contention resolution block according to a destination and outputting the collected channels as multiplexed optical signals; and
   a controller for recognizing a destination of each branched channel input from the branching section and outputting the first control signal to the switching section and a second control signal to the contention resolution block so as to allow each channel to be directed to the destination of each channel,
   wherein a frame transmitted on the multi-ring network includes a burst datum consisting of a plurality of packet data, and a header datum indicating a destination of the burst datum.

2. The optical multi-ring network according to claim 1, wherein the at least two fiber links include working fiber link and a protection fiber link.

3. The optical multi-ring network according to claim 1, wherein the plurality of channels is 32 or less.

4. The optical multi-ring network according to claim 1, wherein the plurality of channels is 64 or less.

5. The optical multi-ring network according to claim 1, wherein the plurality of channels is 128 or less.

6. An optical multi-ring network according to claim 1, further comprising:
   a plurality of tap couplers located within the branching section.

7. An optical multi-ring network according to claim 6, wherein the plurality of tap couplers are connected to n number of output terminals of the demultiplexer in a one-to-one correspondence, where n is a positive, whole number.

8. An optical multi-ring network according to claim 1, wherein, the plurality of buffers are subdivided according to a destination and permitting packet data stored at the individual buffer in a predetermined length to be bound to create a burst datum.

9. An optical multi-ring network for burst data communication, comprising:
   a plurality of optical single-ring networks having a plurality of optical add/drop routers connected to each other through at least two fiber links and a plurality of ingress nodes connected with the plurality of optical add/drop routers in a one-to-one correspondence; and
   a core optical router for supporting communication between the optical single-ring networks, the core optical router including:
   a wavelength division demultiplexer arranged to demultiplex at least one optical signal received from at least one of the single-ring networks and output the demultiplexed optical signal to a plurality of channels the wavelengths of which are different from each other;
   a branching circuit arranged to branch off and output a portion of the demultiplexed optical signal on at least one of the plurality of channels;
   a switching section for switching the at least one of the plurality of channels to a path directed to a destination of the at least one channel according to a first control signal;
   a contention resolution block for aligning channels in a chronological order, which are output at the switching section and directed to identical destinations, according to a second control signal;
   a wavelength division multiplexer for collecting channels which pass through the contention resolution block according to a destination and outputting the collected channels as multiplexed optical signals; and a controller for recognizing a destination of each branched channel input from the branching section and outputting the first control signal to the switching section and a second control signal to the contention resolution block so as to allow each channel to be directed to the destination of each channel, wherein a frame transmitted on the multi-ring network includes a burst datum consisting of a plurality of packet data, and a header datum indicating a destination of the burst datum, wherein the optical add/drop routers perform demultiplexing of at least one optical signal into a plurality of channels by wavelength, branch off a portion of each channel, recognize a destination of a modulated frame on each branched channel, drop channels targeting the same optical add/drop router in which the at least one received optical signal was received while multiplexing both any other channels targeting another one of the plurality of optical add/drop router and added channels to output the multiplexed channels, and, wherein the ingress nodes permit packet data, which have identical destinations and have been input from a plurality of service devices, to be bound at a predetermined length to create a burst datum, permit the burst datum and a header datum indicating a destination of the burst datum to be bound in order to create a frame, and add a channel modulated by the frame to the optical add/drop router.

10. The optical multi-ring network according to claim 9, wherein the plurality of services devices include one or more of an IP router, an Ethernet switch, a SONET equipment.

11. The optical multi-ring network according to claim 9, further comprising a plurality of egress nodes, wherein the egress nodes are connected with the plurality of optical add/drop routers in a one-to-one correspondence, demodulate frames on the channels input from respective optical add/drop routers, disassemble the burst datum of the frames into packet data, and output the packet data to a corresponding physically connected service devices according to IP addresses of the packet data.

12. The optical multi-ring network according to claim 11, wherein the plurality of services devices include one or more of an IP router, an Ethernet switch, a SONET equipment.

13. The optical multi-ring network according to claim 1, wherein each of the optical add/drop router coupled to a respective egress node, wherein the egress node includes:

an optical receiving section for demodulating frames on the channels input from the add/drop section of the optical add/drop router;

a burst disassembler for removing the header datum form each frame and for disassembling the burst datum into packet data;

an IP packet forwarding section for recognizing IP addresses of the packet data inputted from the burst disassembler;

a plurality of interface cards physically connected with a plurality of service devices; and an electric switch for permitting the packet data inputted from the IP packet forwarding section to be output to the corresponding interface cards according to IP addresses.

14. The optical multi-ring network according to claim 13, wherein the egress node further includes a look-up table for storing a sequence of the corresponding interface cards according to each IP address.

15. The optical multi-ring network according to claim 13, wherein the branching section branches approximately 10% of a power level of each channel to the optical receiving section.

\* \* \* \* \*